2 Sheets—Sheet 1.
W. P. FRENCH.
BAND CUTTER FOR THRESHING MACHINES.
No. 66,143. Patented June 25, 1867.
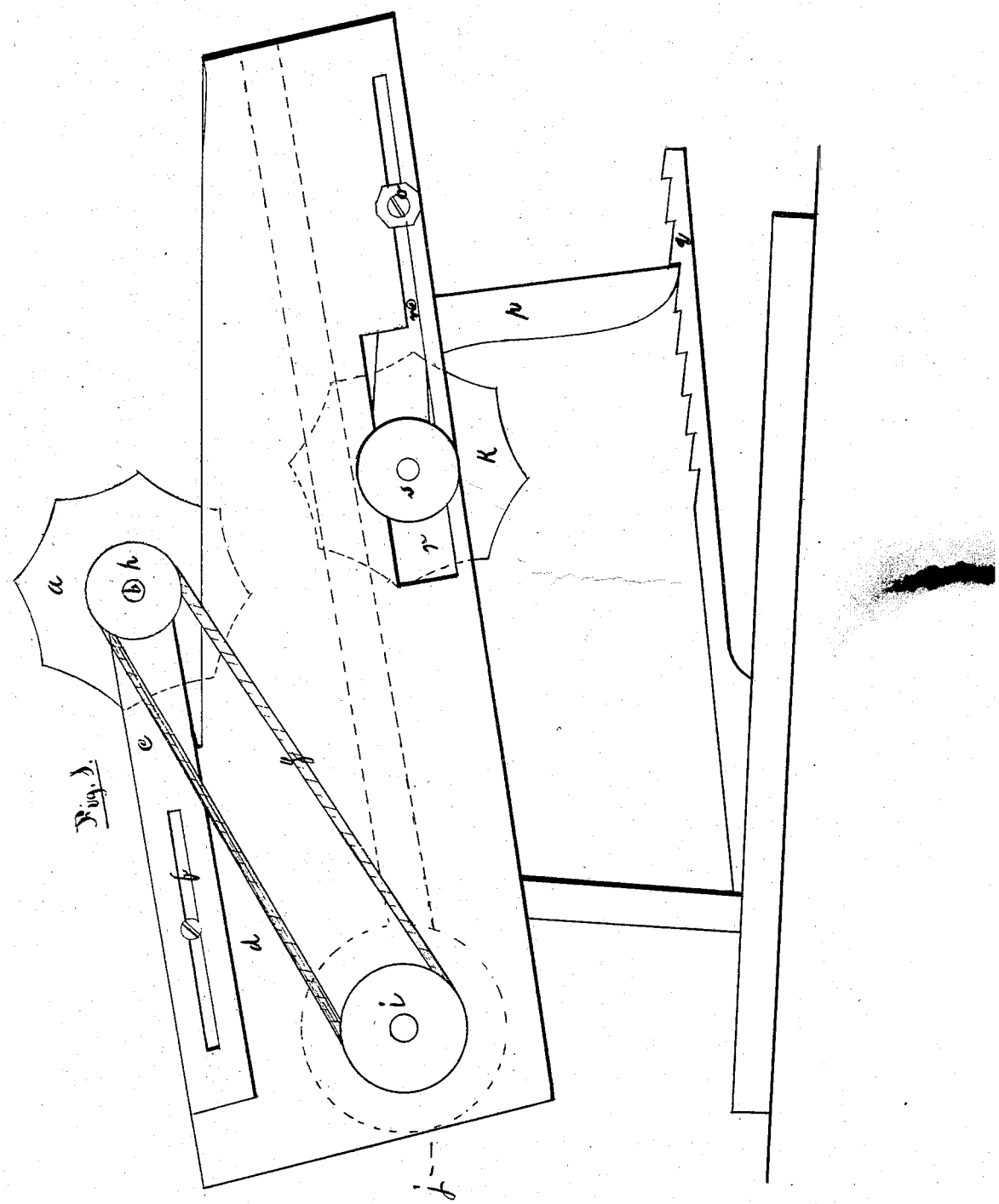

2 Sheets—Sheet 2.
W. P. FRENCH.
BAND CUTTER FOR THRESHING MACHINES.
No. 66,143. Patented June 25, 1867.
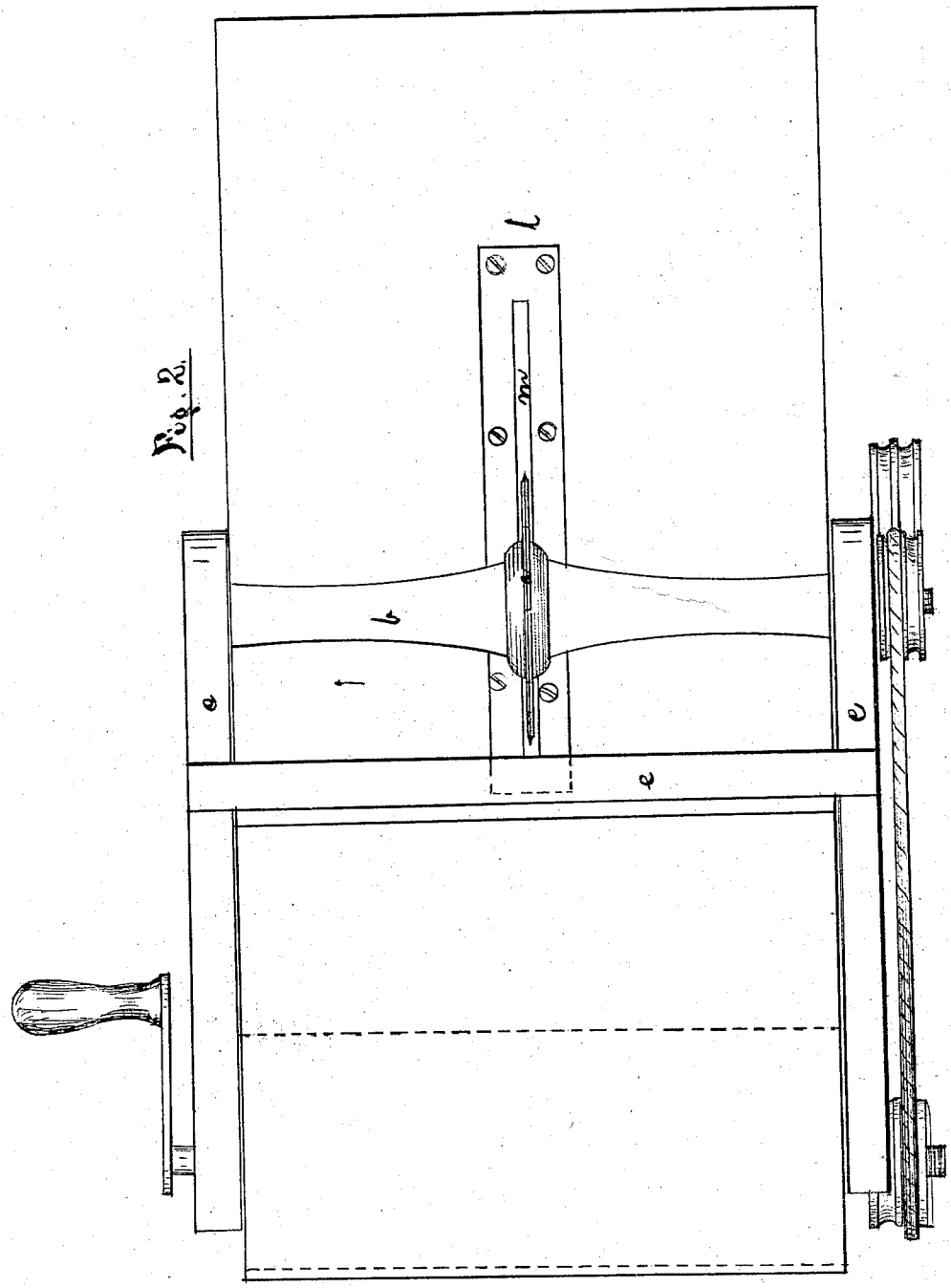

United States Patent Office.

WILLIAM P. FRENCH, OF WASHINGTON, IOWA.

Letters Patent No. 66,143, dated June 25, 1867.

BAND-CUTTER FOR THRESHING MACHINE.

The Schedule referred to in these Letters Patent and making part of the same.

TO ALL WHOM IT MAY CONCERN:

Be it known that I, WILLIAM P. FRENCH, of Washington, in the State of Iowa, have invented a certain new and useful Improvement on Band-Cutters for Threshing Machines; and I do hereby declare that the following is a full, clear, and exact description of the construction and operation of the same, reference being had to the accompanying drawings and to the letters and marks thereon, which said drawings form part of this specification, and show my invention applied to the feeding-trough of a threshing machine—

Figure 1 being a side view of the trough, and

Figure 2 a top view thereof.

In both of these figures where like parts are shown like letters and marks are used to indicate the parts.

An upper rotary cutter, $a$, is attached to a shaft, $b$, having its bearings in arms $c$ pivoted to the sides of the trough $d$, and the arms $b$ secured to each other by a cross-bar, $e$. A slot, $f$, in the arms $c$ gives passage to the pivoting screw or pin, and allows the arms to be moved forward or backward, so that the cutter and its shaft may be adjusted both forward and backward and upward and downward, the better to adapt the cutter to the difference in size of sheaf, and for any other purpose for which adjustment may be required. The cutter $a$ is rotated by a band, $g$, passing around a pulley, $h$, on the shaft $b$, and around the pulley $i$ of the feeding-rollers $j$. A lower rotary cutter, $k$, is affixed to a shaft under the bottom $l$ of the trough, a slot, $m$, therein giving it a way or passage. The shaft of this cutter has its bearings in the arms of another shaft pivoted at $n$ into blocks, which, by the screw and nut $o$, are held on the inner side of the slot $m$, against and along which the block and screw may traverse, so that the cutter $k$ and its shaft may be moved backward and forward. An arm, $p$, extends downwards from the pivoted shaft to the toothed spring-bar $q$. The moving forward of the lower end of the arm $p$ elevates the cutter $k$ through the slot $m$, while the moving of the arm $p$ backward depresses the cutter $k$, a slot, $r$, in the side of the trough, allowing of this movement of the cutter and shaft. This cutter may be brought below the bottom of the trough when only the upper cutter can be used. The lower cutter $k$ has, therefore, also the adjustment upwards and downwards and backwards and forwards. The movements of this cutter upwards may be effected by an eccentric or cam instead of the means shown. The cutter $k$ derives its motion, its rotation, by a band around a pulley, $s$, on the end of its shaft, and around the pulley $i$ of the feed-roller. The cutters or knives $a$ and $k$ may be formed as shown by the drawings, or they may be of the form of segments projecting from a periphery, or of any pointed form desirable.

What I claim as my improvement on the rotary band-cutter, is—

The double adjustability caused by the means substantially herein set forth.

This specification signed this 29th day of March, 1867.

WM. P. FRENCH.

Witnesses:
S. P. BISHOP,
DAVID PRESSLY.